(12) United States Patent
Kambhatla

(10) Patent No.: US 9,575,863 B2
(45) Date of Patent: Feb. 21, 2017

(54) APPARATUS OF WIRELESS GIGABIT DISPLAY EXTENSION (WDE) DEVICE

(71) Applicant: Intel Corporation, Santa Clara, CA (US)

(72) Inventor: Srikanth Kambhatla, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/042,484

(22) Filed: Feb. 12, 2016

(65) Prior Publication Data

US 2016/0283342 A1 Sep. 29, 2016

Related U.S. Application Data

(63) Continuation of application No. 13/627,030, filed on Sep. 26, 2012, now Pat. No. 9,343,039.

(51) Int. Cl.
*G06F 3/00* (2006.01)
*G06F 11/30* (2006.01)
*G09G 5/00* (2006.01)
*H04N 21/4363* (2011.01)
*H04N 21/4143* (2011.01)
*H04N 21/41* (2011.01)
*H04L 29/06* (2006.01)

(52) U.S. Cl.
CPC ....... *G06F 11/3055* (2013.01); *G06F 11/3048* (2013.01); *G09G 5/006* (2013.01); *H04N 21/4122* (2013.01); *H04N 21/4143* (2013.01); *H04N 21/43637* (2013.01); *G09G 2370/045* (2013.01); *G09G 2370/16* (2013.01); *H04L 69/08* (2013.01); *H04L 69/18* (2013.01)

(58) Field of Classification Search
CPC ............... G09G 2370/16; G09G 2370/045; G09G 5/006; H04N 21/4122; H04N 21/43637; H04N 21/43635; H04N 21/41407; H04L 69/08; H04L 69/18
See application file for complete search history.

(56) References Cited

U.S. PATENT DOCUMENTS

| 8,918,569 | B2 * | 12/2014 | Kambhatla | H04N 21/4122 710/106 |
| 2013/0229574 | A1 * | 9/2013 | MacInnis | H04N 21/4122 348/497 |
| 2013/0268621 | A1 * | 10/2013 | Mese | H04N 19/176 709/217 |

* cited by examiner

*Primary Examiner* — Ernest Unelus
(74) *Attorney, Agent, or Firm* — Schwegman Lundberg & Woessner, P.A.

(57) ABSTRACT

In accordance with some embodiments, a DisplayPort control plane may be supported over a Wireless Gigabit Alliance or other wireless air interface. Some embodiments may efficiently optimize the amount of wireless bandwidth needed to accomplish tasks.

18 Claims, 4 Drawing Sheets

APPARATUS OF WIRELESS GIGABIT DISPLAY EXTENSION (WDE) DEVICE

CROSS-REFERENCE TO RELATED APPLICATIONS

This application is a continuation of U.S. patent application Ser. No. 13/627,030 filed on Sep. 26, 2012 now issued as U.S. Pat. No. 9,343,039, which is hereby expressly incorporated by reference herein in its entirety.

BACKGROUND

This relates generally to devices that source and sink video and audio data.

DisplayPort is a digital audio/video interconnect standard of the Video Electronics Standards Association (VESA), Newark, Calif. 94560. See DisplayPort Specification, Version 1.2, December 2009. It allows video and audio to be coupled from a computer to a video display or an audio playback system. A DisplayPort connector supports 1, 2, or 4 data pairs in a main link that also carries clock and optional audio signals with symbol rates of 1.62, 2.7, or 5.4 gigabits per second.

Display or sink devices can be connected to source devices, such as personal computers or consumer electronic devices, either directly or through what are called branch devices. Many types of branch devices exist including repeaters that repeat audio or video information, converters that convert audio or video information from one format to another, replicators, which reproduce the data, and concentrators that take streams from two or more source device inputs and transmit them on downstream links.

Various wireless communication protocols exist that support DisplayPort and High-Definition Multimedia Interface (HDMI) monitors or sink devices. For example the Wireless Gigabit Alliance display extension (WDE) specification targets support of DisplayPort and High-Definition Multimedia Interface (HDMI) monitors over a 60 gigaHertz Wireless Gigabit Alliance (Beaverton, Oreg. 97006) air interface. See Wireless Gigabit Alliance Specification Version 1.0.

BRIEF DESCRIPTION OF THE DRAWINGS

Some embodiments are described with respect to the following figures.

DETAILED DESCRIPTION

In accordance with some embodiments, a DisplayPort control plane may be supported over a Wireless Gigabit Alliance (WiGig) or other wireless air interface. Some embodiments may efficiently optimize the amount of wireless bandwidth needed to accomplish tasks.

Figure 1:
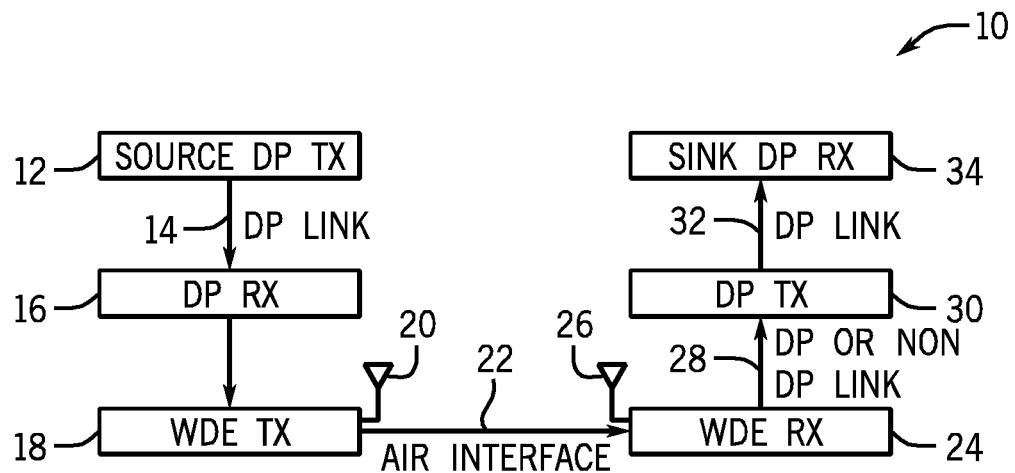
FIG. 1 is a schematic depiction of a system for coupling a DisplayPort transmitting source to a display port receiving sink over a wireless air interface according to one embodiment.

Referring to FIG. 1, a display topology 10 includes a source which includes a DisplayPort transmitter as indicated at 12. A DisplayPort link 14 couples the source to a DisplayPort receiver 16. The DisplayPort receiver 16 is coupled to a Wireless Gigabit Alliance display extension (WDE) transmitter 18 but any other wireless transmitter might also be used.

For example, the embodiment shown in FIG. 1 could be implemented as a notebook computer that has a built-in WiGig network interface card. In this case, the DisplayPort link 14 shown in FIG. 1 would come out of the notebook computer.

Figure 1A:
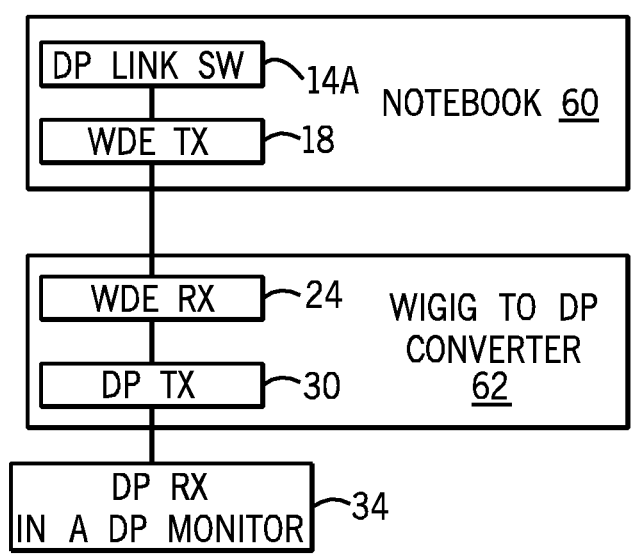
FIG. 1A is a schematic depiction of a system for coupling a notebook computer to an external DisplayPort to Wireless Gigabit Alliance converter device according to one embodiment.

Referring to FIG. 1A, in accordance with another embodiment, implemented by a notebook computer connected to an external DisplayPort to Wireless Gigabit Alliance converter device, a notebook 60 may include the DisplayPort link software 62 and the WDE transmitter 18. The notebook 60 may be coupled to a WDE receiver 24 and a DisplayPort transmitter 30 contained in the Wireless Gigabit Alliance to DisplayPort converter 62. Then a DisplayPort receiver 34 may be contained within a DisplayPort monitor.

As used herein, a source device is any device that is a source of an audio or video stream. Examples include personal computers, camcorders, digital video display devices, or blue ray disc players to mention a few examples. Branch devices such as the display port receiver 16 are devices that take as an input one or more audio and/or video streams from one or more upstream links and deliver one or more audio and/or video streams to one or more downstream links.

Wireless Gigabit Alliance display extension (WDE) is an industry standard that defines the framework for audio video streaming over Wireless Gigabit Alliance PHY and MAC layers. A WDE transmitter is a transmit functionality in WDE. It may be present in source devices and in branch devices that support WDE downstream.

The WDE transmitter 18 may communicate with a WDE receiver 24 using antennas 20 and 26 over an air interface 22. The WDE receiver 24 may communicate over a DisplayPort or non-DisplayPort link 28 with a DisplayPort transmitter 30. The DisplayPort transmitter 30 communicates over DisplayPort link 32 with a sink or DisplayPort receiver 34. A sink device is a device that determinates an audio or video stream by displaying the content. An example is a television or monitor.

A Native Wireless Gigabit Alliance Sink (NWS) is a sink device that uses a Wireless Gigabit Alliance device as the wireless interface to connect to other devices in a display topology. However, it is not precluded that such sink support other wired or wireless interfaces in addition to a Wireless Gigabit Alliance interface.

A display topology is a set of audio/video devices including at least one source device, at least one sink device, and zero or more branch devices. The topology may have a wired or wireless link between devices. Wireless links may be Wireless Gigabit Alliance or other technologies. The WDE receiver is the receive functionality in WDE, present in NWS devices and in branch devices that support WDE upstream.

MCCS is the monitor control and command set specification from VESA, version 2.2a, 13 Jan. 2011.

Figure 2:
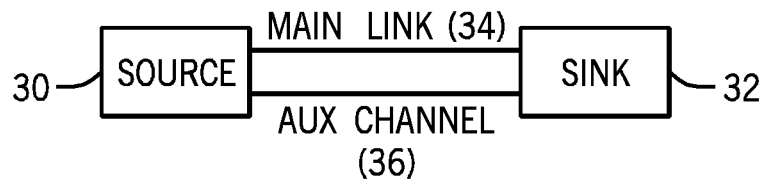
FIG. 2 is a topology for one embodiment.

Referring to FIG. 2, a DisplayPort control plane operation is performed over a bi-directional, half duplex auxiliary channel called an AUX channel 36, that carries device management and device control data for the main link 34. In a two-level topology consisting of a source device 30 and a sink device 32, the DisplayPort standard uses AUX transactions and a native AUX protocol as defined in the DisplayPort standard, version 1.2. When the source and sink devices are connected using branch devices in a topology, DisplayPort defines a message transaction layer and sideband messages for control plane communications over the AUX channel. In some embodiments, both the AUX transactions and the message transaction layer are efficiently supported over the Wireless Gigabit Alliance air interface. However, other wireless or wired interfaces in lieu thereof upstream of DisplayPort may also be used.

Communication over the air interface between the WDE transmitter and receiver is packet based as defined in the WDE specification. There are certain packet types dedicated for data and others for control. The control packets carry AUX-based communications between WDE transmitters and receivers. The control packets are structured as follows:

| | Transaction ID | PT Type | Frame Number | Endpoint Index | Video Stream ID | Audio Stream ID | PT Content |
|---|---|---|---|---|---|---|---|
| Octets | 1 | 1 | 1 | 1 | 1 | 1 | Variable |

The Pass Through (PT) type defines different subtypes of the control packets and PT content contains subtype specific payload. Other fields are present for synchronization between source and sink devices.

Among the PT types defined for DisplayPort, the following subtypes are enhancements to enable AUX-based communications:

| Value | PT Type |
|---|---|
| 0 | HPD Notify (long pulse) |
| 1 | HPD Sink Event (short pulse) |
| 2 | AUX Request Transaction Packet |
| 3 | AUX Response Transaction Packet |
| 4 | Message Transaction Packet |
| 5 | Secondary Data Packet |
| 6 | Main Stream Attribute Packet |
| 7 | VB-ID |
| 8 | Device Control Request |
| 9 | Device Control Response |
| Others | Reserved |

Mark value 0, 1 and 5-9 may be defined in the WDE specification for non-AUX related DisplayPort purposes.

AUX Request Transaction Packets are used to initiate AUX transactions for discovering downstream DisplayPort (DP) topology as defined in the DisplayPort 1.2 specification. The combination of a WDE transmitter (TX) and WDE receiver (RX) logically serve as wire replacement in the DisplayPort topology for the purposes of adjacency determination. For example, the topology [(graphics processing unit (GPU)-WDE TX]-[WDE RX-DP TX]-[DP RX in monitor], is equivalent to [GPU-DP TX]-[DP RX in monitor], with square brackets conveying device boundaries. In both the topologies in the example, GPU software may use AUX transactions to do the monitoring rather than sideband messages. However, GPU software may use sideband messages to DP RX #2 in the following topology: [GPU-WDE TX]-[WDE RX-DP TX1]-[DP RX1-DP TX2]-[DP RX2 in monitor].

DisplayPort AUX transactions between adjacent DisplayPort devices may be supported using AUX requests and AUX response transaction packets. DisplayPort sideband messages between DisplayPort devices that are not adjacent to each other may be supported using a message transaction packet.

The AUX request transaction packets are transmitted by the WDE transmitter and are transferred over an AUX channel by the DisplayPort transmitter on the WDE receiver. Subsequently, the WDE receiver originates in the AUX response transaction packet. The PT content for these packets is defined hereinafter.

A message transaction packet is transmitted by the WDE transmitter or receiver. Each PT content field may be formatted according to the definition of the message transaction layer specified in §2.11.2 of the VESA Display Port Standard Version 1, Revision 2. In particular the content of this packet is not broken down into individual sideband message packets. Instead that task is performed by software driving the DisplayPort transmitter or receivers and is abstracted from the WDE transmitter or receiver blocks.

AUX protocol may involve fragmentation of data to be exchanged in a maximum of 16 byte chunks. Efficiency over the air may be achieved by coalescing multiple AUX transactions into a single data transfer operation, essentially introducing a two-tier packetization of data to be transferred: a) 64K byte fragments over the air, and b) 16 byte chunks over the AUX channel on the DP link. When AUX read or write transactions are performed, the WDE transmitter or receiver devices target chunks of up to 64K bytes instead and leave the AUX fragmentation and merging to downstream DisplayPort transmit devices. This enables less protocol overhead and more bursting efficiency in some embodiments. The two-tier packetization may optimize for the common case where the AUX transactions are successful.

As another alternative, or in addition, efficiency over the air may achieved using AUX protocol that involves an ACK or acknowledge, and a NAK or non-acknowledge, and defer based handshakes between the DisplayPort transmitter and the DisplayPort receiver. In such case, efficiency is achieved by not making these interactions visible over the air. That is, these AUX specific details and associated follow-up actions and policies such as retransmissions or aborts are handled at the DisplayPort transmitter. Remote, over the air interaction over WDE, abstracts these into a higher level (up to) 64 kilobyte sized interactions.

The PT content for AUX requests and response transactions may be as follows. There are two types of AUX transactions: AUX request transactions and AUX response transactions. An AUX request transaction is initiated by the WDE transmitter. The PT content field for an AUX request transaction may be as follows:

| | Request Type | AUX Address | AUX Request Payload |
|---|---|---|---|
| Octets | 1 | 3 | Variable |

A request type field indicates the type of request being issued. In one embodiment, it can have a value of zero for an AUX write, a value of 1 for an AUX read, and a value of 2 for abort, to abort a previously issued AUX read or write transaction. The transaction to be aborted is identified by its transaction identifier used in the request.

An AUX address indicates the address for read or write operations being targeted. Only the 20 least significant bits of three octets contain the AUX address as specified in the DisplayPort standard version 1.2. The four most significant bits may be set to zeros.

The structure of a AUX request payload depends on the request type. For an AUX write, the AUX request payload is shown as follows:

|        | Bytes to Write | Write Data |
|--------|----------------|------------|
| Octets | 2              | Variable   |

An AUX request payload structure for an AUX read is as follows:

|        | Bytes to Read |
|--------|---------------|
| Octets | 2             |

When the request type is abort, the AUX request payload field is not present. The AUX response transaction is always initiated by a WDE receiver. The PT content field for an AUX request transaction is as follows:

|        | Response Type | AUX Response Payload |
|--------|---------------|----------------------|
| Octets | 1             | Variable             |

The response type indicates success or failure for a previously issued AUX transaction. It may be set at zero for read acknowledge indicating that the AUX read transaction was successful, one for a read not acknowledge indicating that the read transaction was non-successful, two for a write acknowledge indicating that the write transaction was successful, and three for a write not acknowledge indicating that the AUX write transaction was not successful. The AUX response payload provides the following additional data depending on the value of the response type. When the response type is read acknowledge, the AUX response payload is shown below:

|        | Bytes That Follow | Bytes Read |
|--------|-------------------|------------|
| Octets | 1                 | Variable   |

The payload of the read non-acknowledge (NAK) is shown below:

|        | Failure Reason |
|--------|----------------|
| Octets | 1              |

A failure reason indicates a more specific reason for the failure. This field can also be set to one of the following values, namely zero for a time-out where one of the AUX transactions timed out as per the DisplayPort standard version 1.2 or one to indicate an address is invalid because the AUX transaction targeted an AUX address that is not present in the downstream DisplayPort receiver. There is no AUX response payload for write acknowledge. The payload of an AUX response payload for a write non-acknowledge is as follows:

|        | Failure Reason | Bytes Written |
|--------|----------------|---------------|
| Octets | 1              | 2             |

Valid values for a failure reason are the same as described for a read non-acknowledge. The Bytes Written field contains the number of bytes that were successfully written before the failure occurred.

The DisplayPort transmitter constructs address command fields, performs packetization and manages a reply command field. The WDE receiver consolidates the response written back to the WDE transmitter. Although the framework allows for much larger sized data (2 octets for size field) than is possible in an AUX transaction as defined in the DisplayPort standard version 1.2, the actual size used in WDE transmitters is an implementation choice. An error of one of the AUX fragments after packetization is sufficient to fail the entire AUX transaction in some embodiments.

The DisplayPort 1.2 specification defines both Message Transaction Packets and Sideband Message Packets. WDE Transmitters only deal with Message Transactions, which are broken down into Sideband Message packets by the DisplayPort Transmitter downstream from the WDE Receiver. There is no coalescing of multiple Message Transactions in WDE into a single larger WDE transaction, simply to use the natural upleveling from Sideband Messages as defined in the DisplayPort 1.2 specification and resultant protocol abstraction benefits.

Figure 3:
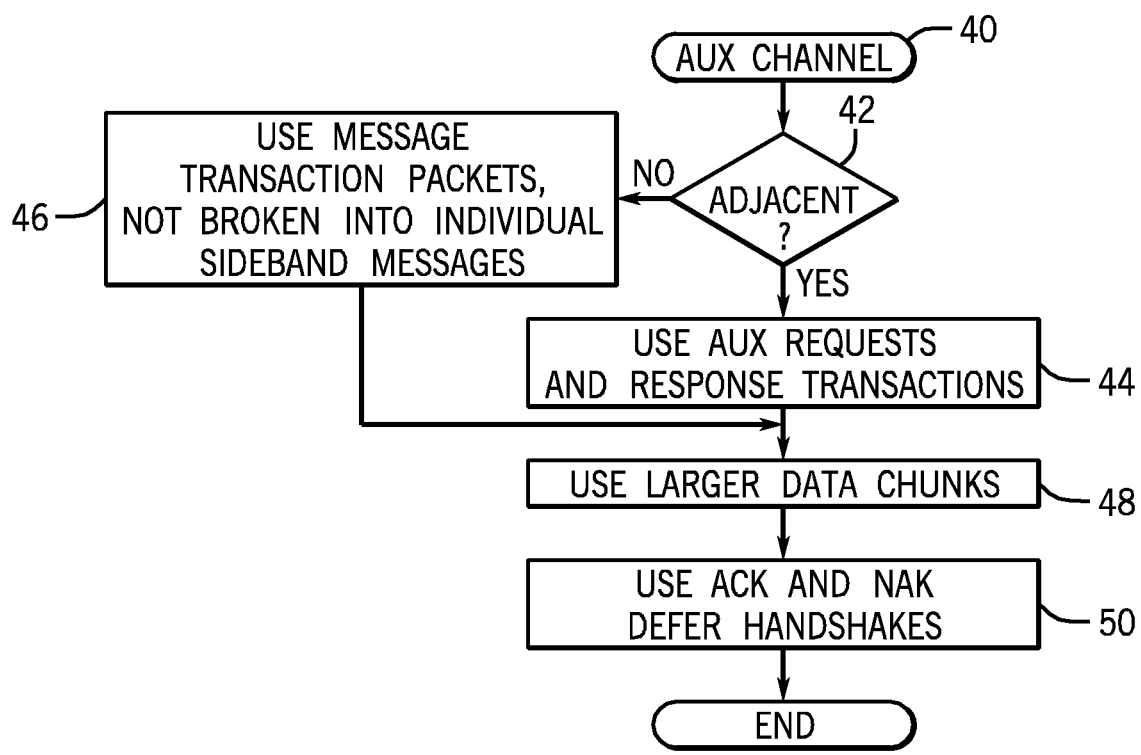
FIG. 3 is a flow chart for one embodiment.

Referring to FIG. 3, in some embodiments, the sequence 40 to implement an AUX channel may be implemented in software, firmware, and/or hardware. In software and firmware embodiments it may be implemented by computer-executed instructions stored in one or more non-transitory computer readable media such as a magnetic, optical or semiconductor storage. In some embodiments, the sequence may be implemented by instructions stored in the transmitter 20 or the receiver 24, or in the transmitter 12 or the receiver 16, as well as in the transmitter 30 or the receiver 34.

Referring to FIG. 3, the sequence 40 begins by determining whether or not the source and the sink are adjacent. They are adjacent if there are no intervening branch devices. If so, AUX requests and response transactions are used as indicated in block 44. Otherwise message transaction packets, not broken down into individual sideband messages, are used as indicated in block 46.

Then larger data chunks may be used as indicated in block 48. For example a minimum 16 byte size up to 64 bytes may be used in some embodiments. Finally as shown in block 50, ACK and NAK or acknowledge and non-acknowledgement messages may be used, while deferring handshakes.

Figure 4:
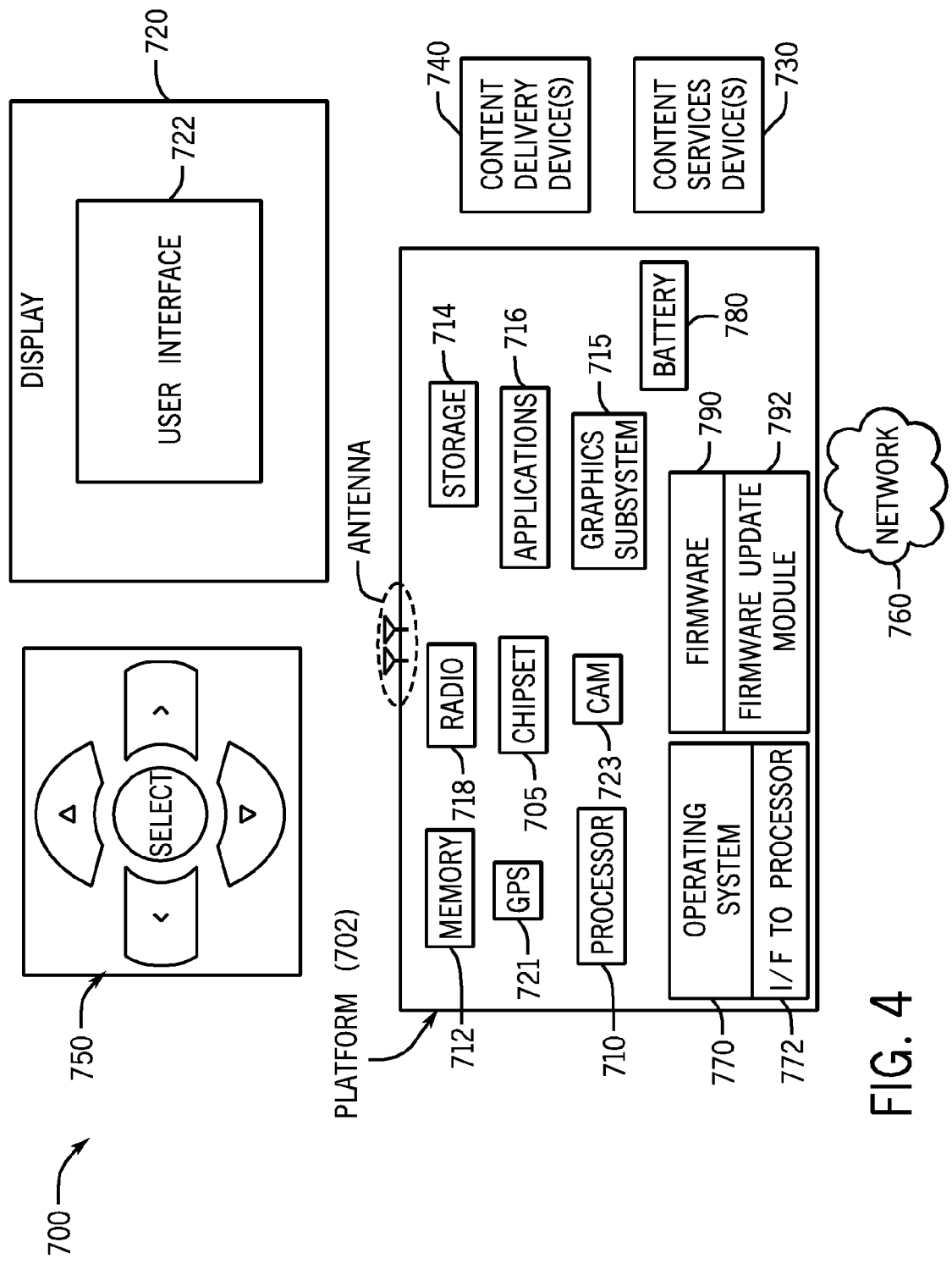
FIG. 4 is a system depiction for one embodiment.

FIG. 4 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequence shown in FIG. 3 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 4.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 5:
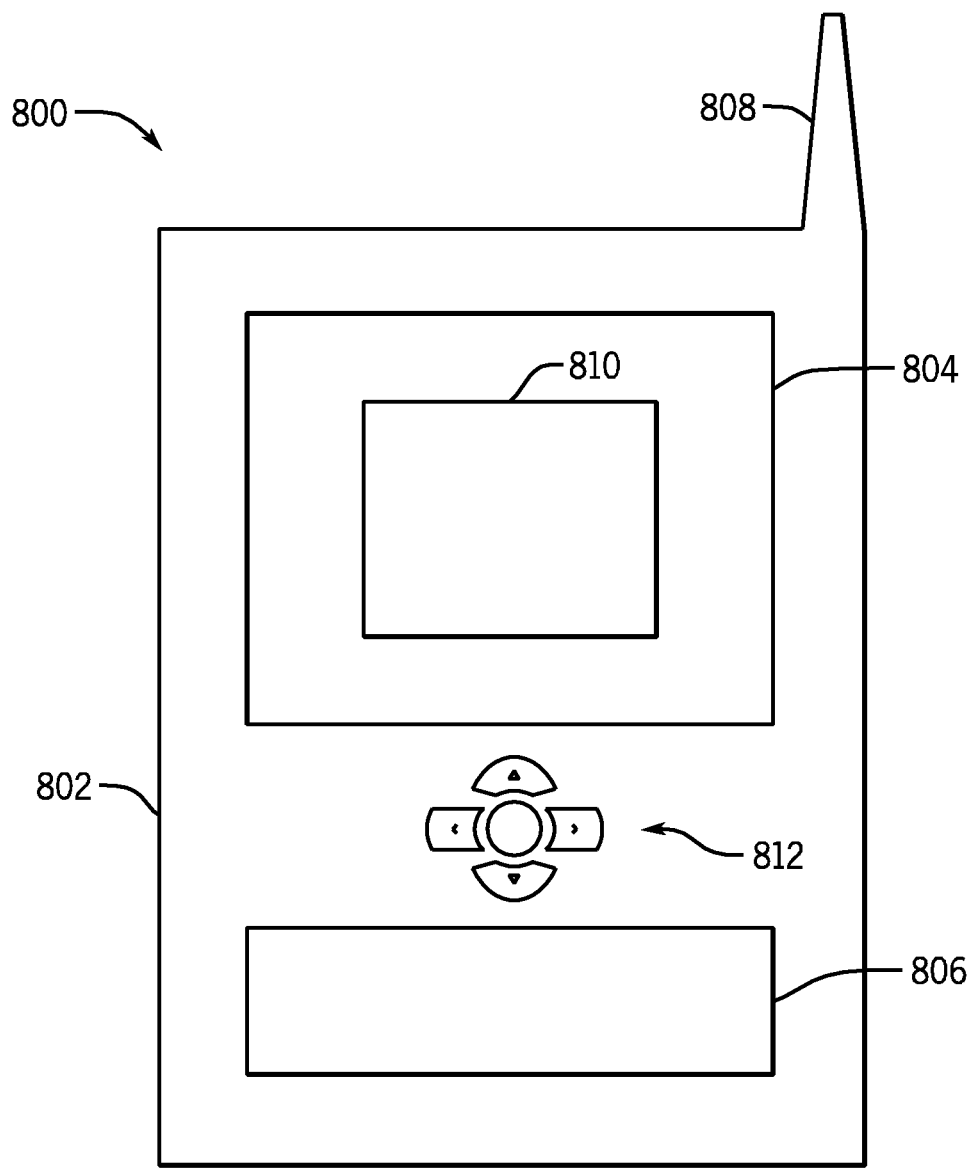
FIG. 5 is a front elevational view of one embodiment.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The following clauses and/or examples pertain to further embodiments:

One example embodiment may be a method comprising establishing a DisplayPort wireless communication over an AUX channel between a source and a sink, and determining if the source and sink are adjacent. The method may also include making a determination of DisplayPort adjacency in the presence of a wireless link. The method may also include performing AUX request and response transactions when the source and sink are adjacent. The method may also include sending message transaction packets when the source and sink are not adjacent. The method may also include if the source and sink are adjacent, using AUX requests and response transactions. The method may also include using packets not broken into individual sideband messages. The method may also include using a two-tier packetization scheme for AUX data transfer. The method may also include sending data chunks larger than 16 bytes. The method may also include using ACK and NAK messages. The method may also include deferring handshakes.

In another example embodiment may be one or more non-transitory readable media storing instructions executed by a computer to enable DisplayPort wireless communication over an AUX channel between a source and a sink, and determine whether the source and sink are adjacent. The media may include further storing instructions to make a determination of DisplayPort adjacency in the presence of wireless links. The media may include further storing instructions to perform AUX requests and response transactions when the source and sink are adjacent. The media may include further storing instructions to send message transaction packets when the source and sink are not adjacent. The media may include further storing instructions to use AUX requests and response transactions if the source and sink are adjacent. The media may include further storing instructions to use packets not broken into individual sideband messages. The media may include further storing instructions to use a two-tier packetization scheme for AUX data transfer. The media may include further storing instructions to send data chunks larger than 16 bytes. The media may include further storing instructions to use ACK and NAK messages. The media may include further storing instructions to defer handshakes.

Another example embodiment may be an apparatus comprising a main link, an AUX channel, and a DisplayPort source to establish wireless communication over the AUX channel between said source and a sink, said source to determine if the source and sink are adjacent. The apparatus may include said source to determine said DisplayPort adjacency in the presence of a wireless link. The apparatus may include said source to send AUX requests and response transactions when the source and sink are adjacent. The apparatus may include said source to send message transaction packets when the source and sink are not adjacent. The apparatus may include said source to determine adjacency using AUX request and response transactions.

In another example embodiment may be an apparatus comprising a main link, a AUX channel, and a sink coupled to said main link and said AUX channel to determine if said sink is adjacent to a source and to establish a DisplayPort wireless communication over said AUX channel between said sink and said source. The apparatus may include said sink to determine said DisplayPort adjacency in the presence of a wireless link. The apparatus may include said sink to receive AUX requests and response transactions when the source and sink are adjacent. The apparatus may include said sink to receive message transaction packets when the source and sink are not adjacent. The apparatus may include said sink to determine adjacency using AUX request and response transactions.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus of a Wireless Gigabit display extension (WDE) device configured for transmission of audio and video over a Wireless Gigabit air interface, the WDE device comprising:
    processing circuitry to convert DisplayPort content from a DisplayPort format to a WDE format;
    a WDE transmitter (TX); and
    a Wireless Gigabit medium access control (MAC) and physical (PHY) layer interface configured by the processing circuitry to provide a bi-directional control plane and a unidirectional data plane,
    the processing circuitry to:
    encode DisplayPort control packets with a first pass through (PT) Type value to initiate an auxiliary (AUX) Request Transaction by the WDE TX, the PT Type value indicating content of the DisplayPort control packets;
    encode DisplayPort control packets with a second PT Type value to indicate message transaction packets;
    configure the WDE TX to transfer the encoded DisplayPort control packets to a WDE receiver (RX) over an AUX channel associated with the bi-directional control plane; and
    configure the WDE TX to transfer the DisplayPort content, in the WDE format, to the WDE RX over a data channel associated with the unidirectional data plane,
    wherein the WiGig MAC and PHY layer interface utilize a 60 GHz band.

2. The apparatus of claim 1 wherein the processing circuitry is configured to break down the message transaction packets in fragments to have a maximum predetermined size.

3. The apparatus of claim 2 wherein the processing circuitry is further configured to decode DisplayPort control packets received from the WDE RX over the control plane to determine a PT type, and
    wherein the DisplayPort control packets received from the WDE RX that comprise AUX response transaction packets are indicated by a third PT Type value.

4. The apparatus of claim 3 wherein the AUX response transaction packets include a response type field to indicate a success or failure of a AUX transaction request,
    wherein the response type field is configured to indicate:
    a read acknowledge (ACK) when a AUX read transaction was successful,
    a read non-acknowledge (NAK) when a AUX read transaction was not successful,
    a write ACK when a AUX write transaction was successful, or
    a write NAK when a AUX write transaction was not successful.

5. The apparatus of claim 3 wherein the DisplayPort control packets received from the WDE RX that comprise message transaction packets have a PT Type value set to the second PT Type value.

6. The apparatus of claim 5 wherein the processing circuitry is configured to set the PT Type value to 2 to indicate an AUX Request Transaction packet, and
    wherein the AUX response transaction packets are indicated by a PT Type value equal to 3.

7. The apparatus of claim 1 wherein the WDE device is configured to operate as a WDE source device.

8. The apparatus of claim 7 wherein the processing circuitry comprises DisplayPort-to-WDE conversion circuitry to convert the DisplayPort content from the DisplayPort format to the WDE format,
    wherein the apparatus further comprising a DisplayPort receiver to receive the DisplayPort content from a display source, and
    wherein the DisplayPort content comprises an audio and/or video stream.

9. The apparatus of claim 8 wherein the WiGig MAC and PHY layer interface are configured to operate in accordance with an IEEE 802.11ad standard.

10. The apparatus of claim 8 further comprising one or more antennas configured for transmission of the DisplayPort control packets and DisplayPort content utilizing the 60 GHz band.

11. A non-transitory computer-readable storage medium that stores instructions for execution by processing circuitry of a Wireless Gigabit display extension (WDE) device to configure the WDE device to operate as a WDE source device, the processing circuitry configured to:
    configure a Wireless Gigabit medium access control (MAC) and physical (PHY) layer interface of the WDE device to provide a bi-directional control plane and a unidirectional data plane;
    encode DisplayPort control packets with a first pass through (PT) Type value to initiate an auxiliary (AUX) Request Transaction, the PT Type value indicating content of the DisplayPort control packets;
    encode DisplayPort control packets with a second PT Type value to indicate message transaction packets;
    configure a WDE transmitter (TX) to transfer the encoded DisplayPort control packets to a WDE receiver (RX) over an AUX channel associated with the bi-directional control plane; and
    configure the WDE TX to transfer DisplayPort content, in WDE format, to the WDE RX over a data channel associated with the unidirectional data plane,
    wherein the WiGig MAC and PHY layer interface utilize a 60 GHz band.

12. The non-transitory computer-readable storage medium of claim 11, wherein the processing circuitry is further configured to:
    convert the DisplayPort content from a DisplayPort format to the WDE format, the DisplayPort received content from a display source.

13. The non-transitory computer-readable storage medium of claim 12 wherein the processing circuitry is configured to break down the message transaction packets in fragments to have a maximum predetermined size.

14. The non-transitory computer-readable storage medium of claim 13 wherein the processing circuitry is further configured to decode DisplayPort control packets received from the WDE RX over the control plane to determine a PT type, and wherein the DisplayPort control packets received from the WDE RX that comprise AUX response transaction packets are indicated by a third PT Type value.

15. An apparatus of a Wireless Gigabit display extension (WDE) device configured for reception of audio and video over a Wireless Gigabit air interface, the WDE device comprising:

processing circuitry;
a WDE receiver (RX); and
a Wireless Gigabit medium access control (MAC) and physical (PHY) layer interface configured by the processing circuitry to provide a bi-directional control plane and a unidirectional data plane,
the processing circuitry to:
configure the WDE RX to receive encoded DisplayPort control packets from a WDE transmitter (TX) over an AUX channel associated with the bi-directional control plane;
configure the WDE RX to receive DisplayPort content, in the WDE format, from the WDE TX over a data channel associated with the unidirectional data plane:
decode the DisplayPort control packets received from the WDE TX to determine a pass through (PT) type value, the PT Type value indicating content of the DisplayPort control packets,
wherein decoded DisplayPort control packets with a first PT Type value indicate an auxiliary (AUX) Request Transaction initiated by the WDE TX,
wherein decoded DisplayPort control packets with a second PT Type value indicate message transaction packets, and
wherein the WiGig MAC and PHY layer interface utilize a 60 GHz band.

16. The apparatus of claim 15 wherein the processing circuitry is further configured to encode DisplayPort control packets for transmission to the WDE TX over the control plane to include a PT type, and wherein DisplayPort control packets comprising AUX response transaction packets are indicated by a third PT Type value.

17. The apparatus of claim 16 wherein the WiGig MAC and PHY layer interface are configured to operate in accordance with an IEEE 802.11ad standard.

18. The apparatus of claim 17 further comprising one or more antennas configured for reception of the DisplayPort control packets and the DisplayPort content utilizing the 60 GHz band.

* * * * *

UNITED STATES PATENT AND TRADEMARK OFFICE
CERTIFICATE OF CORRECTION

PATENT NO. : 9,575,863 B2  
APPLICATION NO. : 15/042484  
DATED : February 21, 2017  
INVENTOR(S) : Srikanth Kambhatla Page 1 of 1

It is certified that error appears in the above-identified patent and that said Letters Patent is hereby corrected as shown below:

In the Claims

Column 15, Line 27, Claim 15, delete "plane:" and insert --plane;-- therefor

Signed and Sealed this  
Fourteenth Day of April, 2020

Andrei Iancu  
*Director of the United States Patent and Trademark Office*